(12) United States Patent
Coppinger et al.

(10) Patent No.: US 9,468,145 B2
(45) Date of Patent: Oct. 18, 2016

(54) SEAL FOR UNLOADING CONVEYOR ARRANGEMENT

(71) Applicant: CNH Industrial America LLC, New Holland, PA (US)

(72) Inventors: Jason R. Coppinger, Davenport, IA (US); Brian L. Scheuring, Mohnton, PA (US); Herbert M. Farley, Elizabethtown, PA (US); Cooper W. Linde, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 14/056,686

(22) Filed: Oct. 17, 2013

(65) Prior Publication Data

US 2014/0113694 A1    Apr. 24, 2014

Related U.S. Application Data

(60) Provisional application No. 61/795,573, filed on Oct. 19, 2012.

(51) Int. Cl.
| | | |
|---|---|---|
| *A01D 17/02* | (2006.01) | |
| *A01F 12/46* | (2006.01) | |
| *A01D 41/12* | (2006.01) | |
| *F16J 15/02* | (2006.01) | |

(52) U.S. Cl.
CPC ............ *A01D 41/1217* (2013.01); *F16J 15/02* (2013.01)

(58) Field of Classification Search
CPC ............ A01D 43/073; A01D 43/087; A01D 41/1217; A01D 41/1208; A01D 90/10; B60P 1/42; B60P 1/40; B65G 33/32

USPC .............. 414/505, 523, 526, 335, 519, 518; 198/671, 536, 550.1; 460/114; 56/13.3, 56/16.6

See application file for complete search history.

(56) References Cited

U.S. PATENT DOCUMENTS

| | | | | |
|---|---|---|---|---|
| 2,613,004 | A * | 10/1952 | Kane .............................. | 414/505 |
| 4,345,416 | A * | 8/1982 | Cameron ....................... | 56/13.3 |
| 4,540,086 | A | 9/1985 | David et al. | |
| 5,409,344 | A * | 4/1995 | Tharaldson ................... | 414/505 |
| 5,465,829 | A * | 11/1995 | Kruse ........................... | 198/538 |
| 5,788,055 | A * | 8/1998 | Stewart et al. ............... | 198/671 |
| 6,497,546 | B2 * | 12/2002 | Wood et al. .................. | 414/523 |
| 6,691,861 | B2 | 2/2004 | Reimer et al. | |
| 7,584,836 | B2 * | 9/2009 | McCully et al. ............. | 198/671 |
| 7,644,816 | B2 | 1/2010 | Veiga Leal et al. | |
| 7,938,613 | B2 * | 5/2011 | Yoder ................ | A01D 41/1217 198/550.1 |
| 8,197,312 | B2 | 6/2012 | Ricketts | |

(Continued)

FOREIGN PATENT DOCUMENTS

| | | |
|---|---|---|
| DE | 10 2010 009 288 A1 | 12/2010 |
| FR | 2 391 637 A1 | 12/1978 |
| GB | 918355 | 2/1963 |

*Primary Examiner* — Árpád Fábián-Kovács
(74) *Attorney, Agent, or Firm* — Peter K. Zacharias; Patrick M. Sheldrake (57) ABSTRACT

An unloading conveyor arrangement for an agricultural machine includes a conveyor having a discharge end, and a spout arrangement at the discharge end of the conveyor. The spout arrangement includes a spout which is connected to the discharge end and movable relative to the conveyor. The spout and the discharge end have an interspatial gap therebetween. The spout arrangement further includes a seal which is attached to the conveyor and/or the spout and extends across the interspatial gap.

22 Claims, 6 Drawing Sheets

(56) References Cited

U.S. PATENT DOCUMENTS

| | | | |
|---|---|---|---|
| 8,752,694 B2* | 6/2014 | Putman | B65G 41/00 198/311 |
| 2003/0079956 A1* | 5/2003 | Reimer et al. | 193/1 |
| 2004/0067125 A1* | 4/2004 | Dillon | 414/502 |
| 2005/0263373 A1* | 12/2005 | Boevers | 198/550.2 |
| 2006/0016164 A1* | 1/2006 | Debruycker | 56/14.6 |
| 2009/0272619 A1* | 11/2009 | Leal et al. | 193/4 |
| 2010/0266377 A1 | 10/2010 | Yoder | |
| 2011/0029205 A1* | 2/2011 | Ricketts | B65G 33/22 701/50 |
| 2013/0028694 A1* | 1/2013 | Van Mill et al. | 414/523 |
| 2013/0037456 A1 | 2/2013 | Haberman et al. | |
| 2013/0096782 A1 | 4/2013 | Good et al. | |

* cited by examiner

SEAL FOR UNLOADING CONVEYOR ARRANGEMENT

CROSS REFERENCE TO RELATED APPLICATIONS

This is a non-provisional patent application based upon U.S. provisional patent application Ser. No. 61/795,573, entitled "PIVOTING UNLOAD SPOUT—GRAIN SEAL WITH NON-LINEAR HINGE", filed Oct. 19, 2012, which is incorporated herein by reference.

BACKGROUND OF THE INVENTION

1. Field of the Invention

The present disclosure relates to unloading conveyors for agricultural harvesters, and, more particularly, to spout arrangements at the discharge end of such unloading conveyors.

2. Description of the Related Art

Unloading of grain from agricultural machines such as combine harvesters is typically accomplished using an elongate unloading conveyor. Such unloading conveyors typically are helical auger type conveyors. The conveyors have a discharge end including a discharge opening through which the grain is propelled by the operation of the conveyor. On some conveyors, the discharge opening faces longitudinally or endwardly such that the grain is propelled more longitudinally outwardly, and on others the opening faces more downwardly such that the grain is correspondingly propelled more downwardly.

Unloading conveyors may include a spout arrangement at the discharge end with a rubber boot configured for guiding or directing the grain which is discharged therefrom. However, such boots are not typically adjustable, and provide only minimal grain flow control and guidance, and little or no extension of the effective length of the conveyor. Such boots also do not provide a closure capability to prevent entry of contaminants, nor an ability to prevent dribbling of grain after an unloading operation.

It is also known to provide adjustable spout arrangements at the discharge end of the conveyor. When unloading grain into a grain truck or wagon, the combine and the receiving container (e.g., truck or wagon) will be initially relatively positioned such that the receiving container is correctly positioned beneath the discharge opening of the unloading conveyor for receiving the flow of grain discharged therefrom. This can be relatively easy to accomplish if the combine and receiving container are stationary, but becomes more difficult if the harvester and the receiving container are moving, and the difficulty increases further if the terrain is uneven and/or sloped, and/or a strong, gusting, and/or direction changing wind is present. Further, the grain holding capacity of many harvesters and receiving containers is quite large, and it may be necessary to vary the grain flow location to spread the grain within the receiving container to prevent spillage over the side of the receiving container.

Still further, autonomous operation of harvesters and grain receiving vehicles is becoming more common, and it is desirable to have an improved capability to vary grain flow to a receiving vehicle to compensate or adjust for variances in the distance between or travel paths of the harvester and receiving vehicle, as well as elevational and angular differences. In this latter regard, to maintain productivity, it may be desired to unload while moving, with one or both of the harvester and receiving vehicle traversing uneven terrain, and/or tilted sidewardly, which may require frequent adjustments in grain flow location to achieve desired grain distribution within the receiving vehicle. It may also be desirable to enhance or increase the effective length of the unloading conveyor, particularly one with a downwardly facing discharge opening, without materially increasing the physical length of the conveyor, particularly when the conveyor is in the stored or transport position extending rearwardly from the harvester.

An anti-dribble capability is also a desirable feature, as it limits inadvertent grain loss and possible crop emergence in undesired areas where loose grain is dropped. It is known to provide a partial ball arrangement at the discharge end of the conveyor which acts as a rigid seal between the conveyor and the spout. Such a rigid seal inhibits the dribbling of grain from the unloading conveyor arrangement.

SUMMARY OF THE INVENTION

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

The present disclosure provides an unloading conveyor arrangement for an agricultural machine which includes a spout which is pivotally attached to the discharge end of an unloading conveyor, and a seal which extends across an interspatial gap between the discharge end and the spout.

The disclosure in one form is directed to an unloading conveyor arrangement for an agricultural machine, including a conveyor having a discharge end, and a spout arrangement at the discharge end of the conveyor. The spout arrangement includes a spout which is connected to the discharge end and movable relative to the conveyor. The spout and the discharge end have an interspatial gap therebetween. The spout arrangement further includes a seal which is attached to the conveyor and/or the spout and extends across the interspatial gap.

The disclosure in another form is directed to an agricultural combine harvester including a chassis, a clean grain tank carried by the chassis, and an unloading conveyor arrangement in communication with the clean grain tank. The unloading conveyor arrangement includes a conveyor having a discharge end, and a spout arrangement at the discharge end of the conveyor. The spout arrangement includes a spout which is connected to the discharge end and movable relative to the conveyor. The spout and the discharge end have an interspatial gap therebetween. The spout arrangement further includes a flexible seal which is attached to the conveyor and/or the spout and extends across the interspatial gap.

An advantage of the present disclosure is that the seal prevents material which is discharged from the conveyor from flowing through the gap between the conveyor and the spout.

Another advantage is that the seal is attached to the discharge end of the conveyor using a non-linear hinge which generally conforms to the exterior shape of the conveyor.

Yet another advantage is that the non-linear hinge can be variously configured, such as a curved strip, a piano hinge and/or a plastic hinge.

Yet another advantage is that the seal holds the grain when the spout is in the folded up position, and inhibits the grain from flowing through the gap between the conveyor and the spout when the spout is in the folded down position.

A further advantage is that the seal can be attached to the discharge end of the conveyor and/or the spout.

A still further advantage is that the seal can be positioned against either the inside or the outside of the spout.

Yet a further advantage is that the conveyor arrangement can be differently configured, such as an auger, a belt conveyor or a chain elevator.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

BRIEF DESCRIPTION OF THE DRAWINGS

The above-mentioned and other features and advantages of this disclosure, and the manner of attaining them, will become more apparent and the disclosure will be better understood by reference to the following description of an embodiment of the disclosure taken in conjunction with the accompanying drawings, wherein.

Corresponding reference characters indicate corresponding parts throughout the several views. The exemplification set out herein illustrates an embodiment of the disclosure, and such exemplification is not to be construed as limiting the scope of the disclosure in any manner.

DETAILED DESCRIPTION OF THE INVENTION

Figure 1:
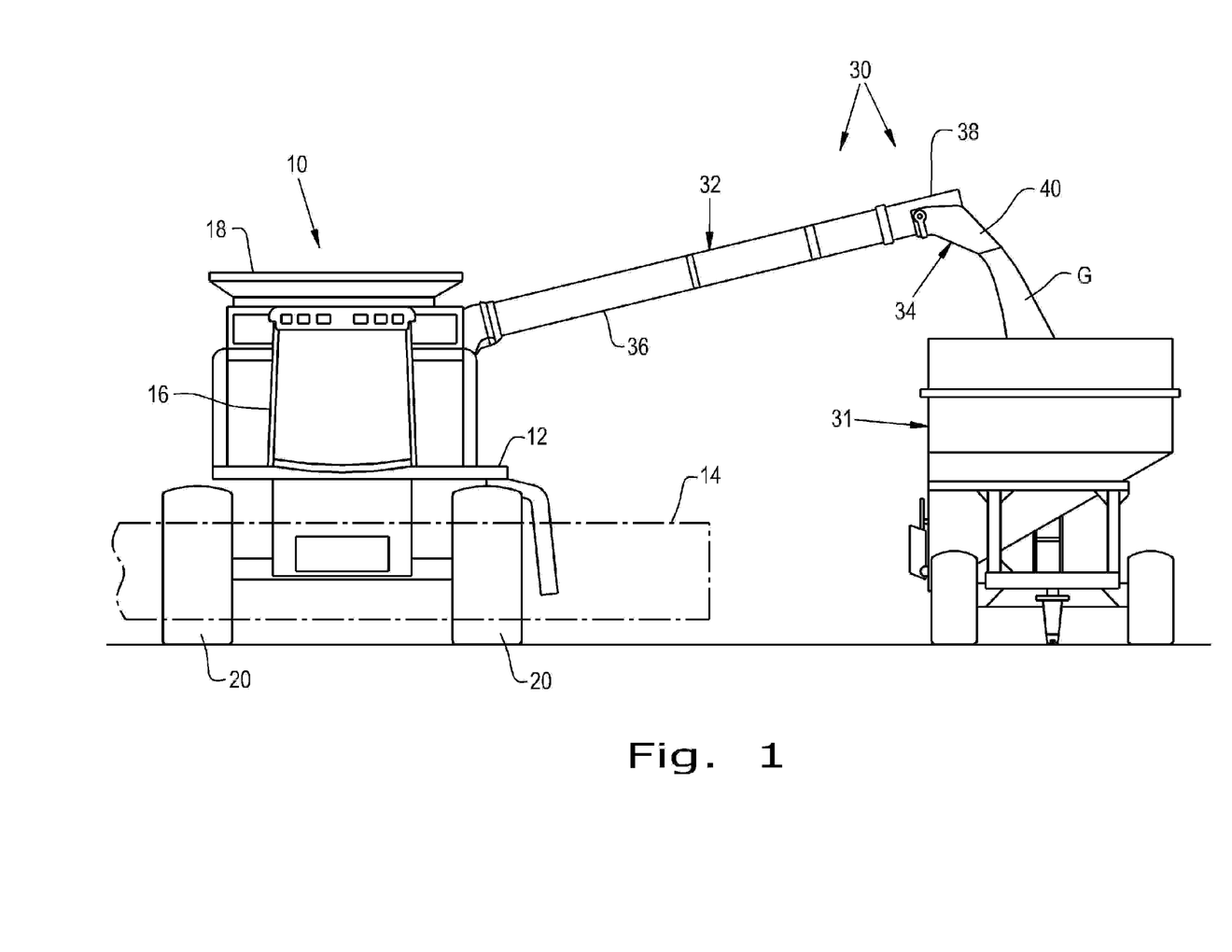
FIG. 1 is a front view of an agricultural vehicle in the form of a combine harvester including an embodiment of an unloading conveyor arrangement of the present application in the unloading position while unloading grain into a receiving container.

Referring now to the drawings, and more particularly to FIG. 1, there is shown a portion of an agricultural machine in the form of a combine harvester 10. Combine 10 generally includes a chassis 12 which carries a number of other components such as a header 14, operator station 16, clean grain tank 18, etc. Motive force can typically be applied through a number of ground engaging wheels, including front drive wheels 20. It may also be possible to use driven tracks (half or full) for some applications.

Figure 2:
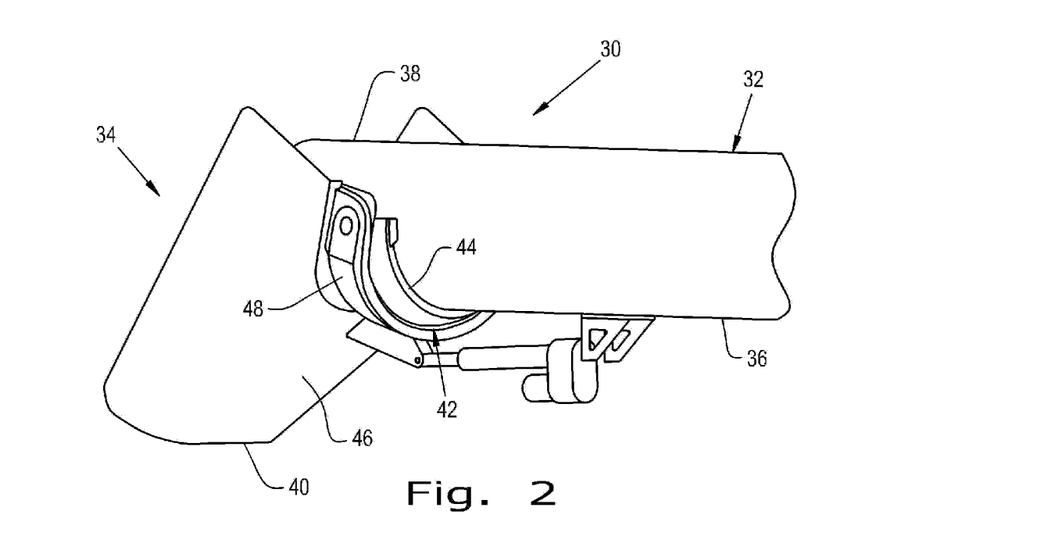
FIG. 2 is a perspective view of the discharge end of the unloading conveyor arrangement shown in FIG. 1.
Figure 3:
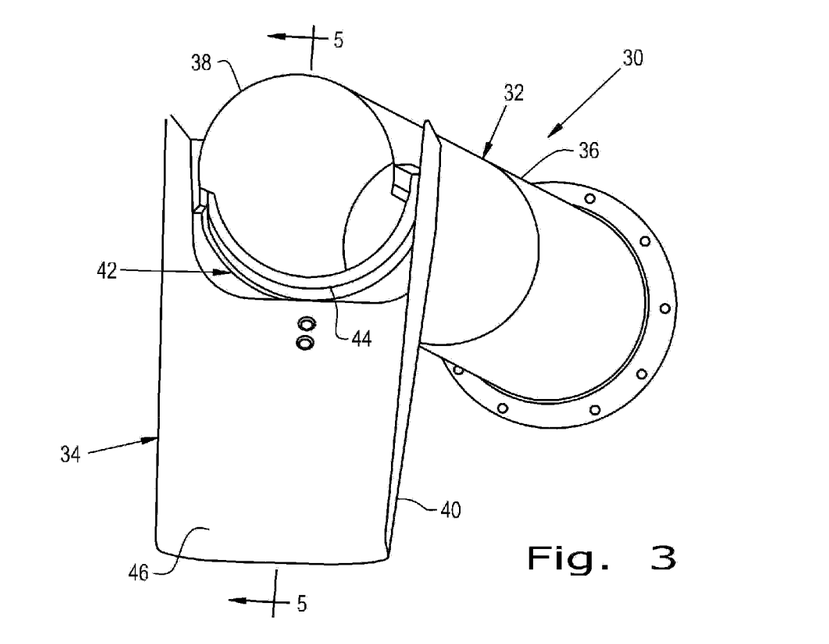
FIG. 3 is another perspective view of the discharge end of the unloading conveyor arrangement shown in FIGS. 1 and 2, with the seal removed.

According to an aspect of the present disclosure, combine 10 also includes an unloading conveyor arrangement 30 which is operable to unload grain "G" (or other material) into a receiving container, such as a gravity wagon 31. Unloading conveyor arrangement 30 generally includes a conveyor 32 and spout arrangement 34. As shown in FIGS. 2 and 3, conveyor 32 can be in the form of an auger with a helical flighting (not shown) which is rotatably positioned within an auger tube 36. Auger tube 36 has an exterior surface with a generally circular contour. Conveyor 32 has a discharge end 38 which generally discharges grain from the axial end of conveyor 32. The discharge end 38 of conveyor 32 can also be configured to discharge the grain in a generally downward direction (e.g., with an opening at the bottom side of discharge end 38).

Conveyor 32 can also be differently configured, such as a belt conveyor or a chain elevator (not shown).

Spout arrangement 34 can be positioned at the discharge end 38 of conveyor 32, and includes a spout 40 which can be connected to discharge end 38 and movable relative to conveyor 32 (FIGS. 2-6). In the illustrated embodiment, spout 40 can be pivotally movable relative to discharge end 38. Spout 40 can also be movable in different directions relative to discharge end 38, such as being movable in a translational direction or rotational direction. Spout 40 and discharge end 38 define an interspatial gap 42 therebetween which can potentially allow grain (or other material, in the event of a different unloading arrangement) to pass through the gap 42 and dribble to the ground. In the embodiment shown, a ball arrangement 44 can be coupled to a bottom of conveyor 32 at discharge end 38. Spout 40 has a bottom wall 46 with a collar 48 at the proximal end of bottom wall 46. Collar 48 can be sized and shaped to lie closely adjacent to ball arrangement 44 during pivoting movement of spout 40, thereby inhibiting grain from dribbling through the interspatial gap 42 therebetween. However, as spout 40 pivotally moves from the downward position (FIG. 5) to the upward position (FIG. 6), some grain can still dribble through the interspatial gap 42.

Figure 4:
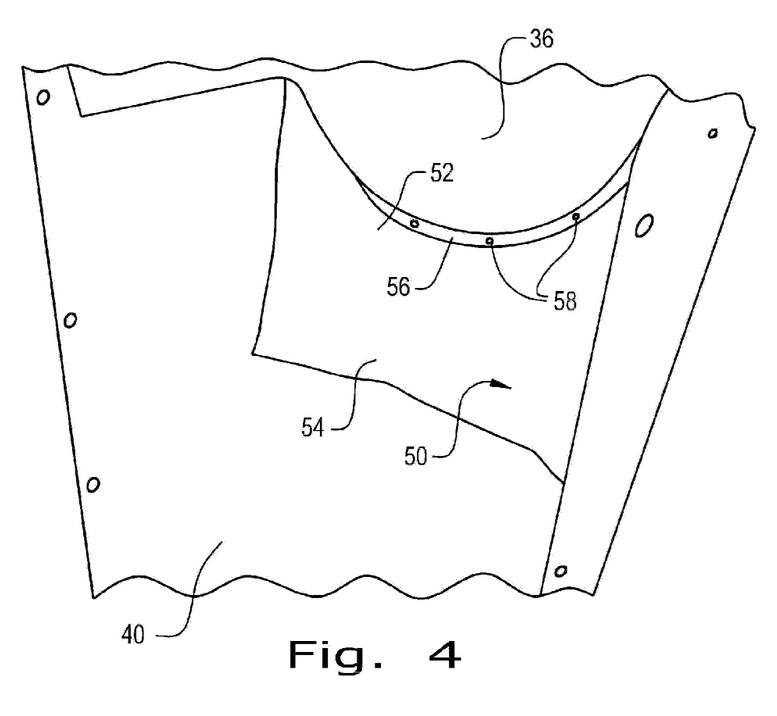
FIG. 4 is an end view of the discharge end of the unloading conveyor arrangement, with an embodiment of the seal of the present application installed.
Figure 5:
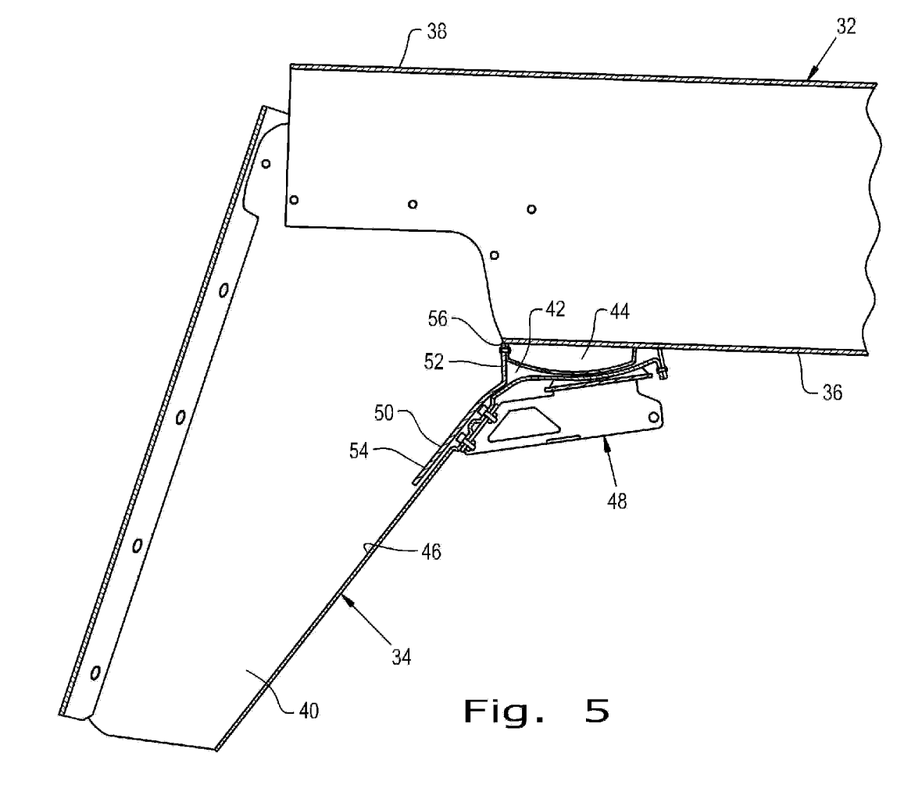
FIG. 5 is a sectional view of the discharge end of unloading conveyor arrangement, taken along line 5-5 in FIG. 3, with the seal installed and the spout folded to a downward position.
Figure 6:
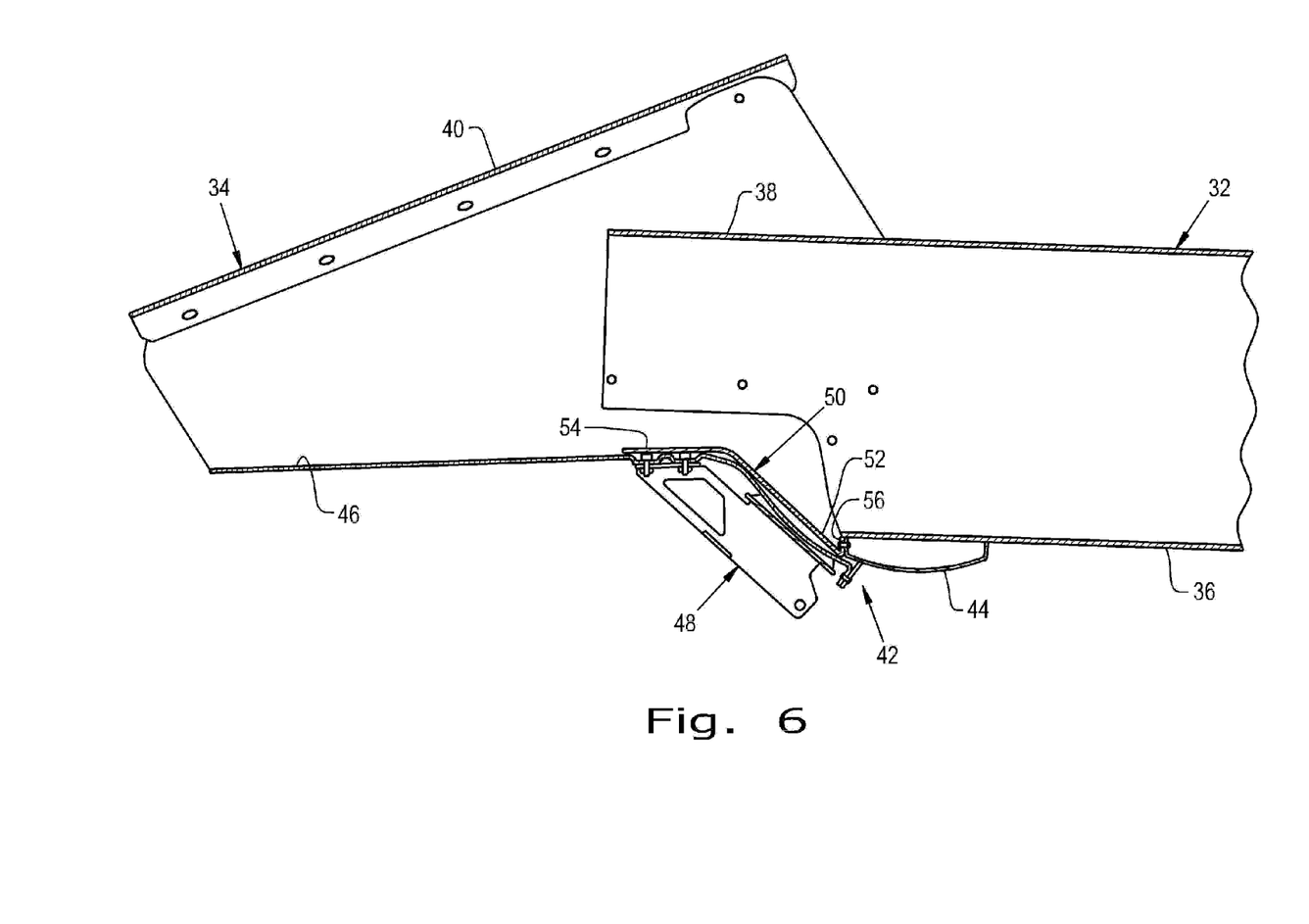
FIG. 6 is a sectional view of the discharge end of the unloading conveyor arrangement shown in FIG. 5, with the spout folded to an upward position.
Figure 7:
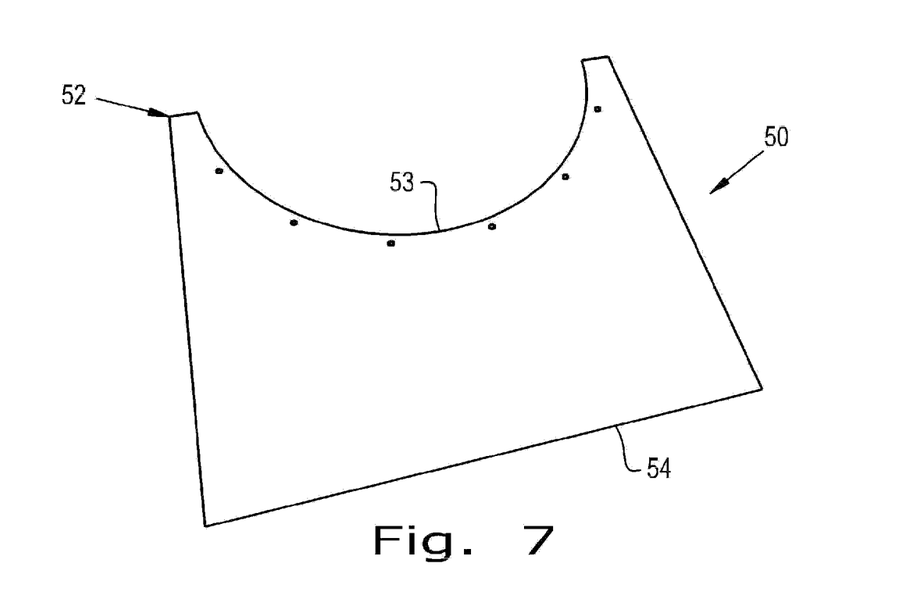
FIG. 7 is a perspective view of the seal shown in FIGS. 4-6.

According to another aspect of the present application, spout arrangement 34 can also include a sheet-like seal 50 which can be attached to conveyor 32 and/or spout 40 and extends across the interspatial gap 42 (FIGS. 4-7). Seal 50 is operable to inhibit grain or other material from passing through the interspatial gap 42. In the illustrated embodiment, seal 50 is a flexible seal in the form of a sheet-like seal, and in particular a flexible bib which has one end 52 which can be attached to discharge end 38 and an opposite free end 54 which can lie against bottom wall 46 of spout 40. The term "sheet-like", as used herein, is intended to mean a sheet of material, whether flat, curved, etc. The end 52 of bib seal 50 defines a side surface 53 with a semi-circular contour which generally matches with the circular contour of auger tube 36. The bib seal 50 can be connected to a bottom of conveyor 32 at discharge end 38 using a non-linear hinge 56 in the form of a curved strip. The curved strip can be a metal strip which can be attached to the distal side of ball arrangement 44 using fasteners such as screws 58 (FIG. 4). The term "non-linear hinge", as used herein, refers to the non-linear axis of rotation of hinge 56, and in the illustrated embodiment refers to the edge of the curved strip 56 about which the flexible bib seal 50 moves during operation.

In another embodiment of the present application, seal 50 can be positioned at the proximal side of spout 40 and extend across the interspatial gap 42 to inhibit the dribbling of grain therethrough. For example, seal 50 can be a flexible sheet-like seal which can be attached at one end with either the bottom of conveyor 32 on the proximal side of ball arrangement 44, or directly attached to the proximal side surface of ball arrangement 44. In either case, the flexible sheet-like seal can be attached using a non-linear hinge in the form of a metal strip, as described above. The distal end of the flexible sheet-like seal 50 can then be likewise attached to the proximal side of spout 40 (or collar 48) using a non-linear hinge in the form of a metal strip. Other attachment options are also possible.

In the embodiment shown, seal 50 is formed from a flexible rubber, and can also be formed from different materials such as a flexible plastic, etc. Seal 50 can also be formed from a relatively rigid sheet-like material which extends across the interspatial gap 42 to inhibit grain from flowing therethrough. When configured as a rigid sheet-like seal, seal 50 can be hinged to conveyor 32 and/or spout 40 to allow movement during pivotal movement of spout 40, and extends across interspatial gap 42.

Likewise, non-linear hinge 56 is formed from a metal curved strip, and can also be differently configured such as a piano hinge, plastic hinge, etc. In the case of a piano hinge, one leaf of the hinge could be bent around the bottom side of conveyor 32, while the opposite leaf of the hinge can include a number of longitudinally adjacent short leaf segments which are attached to seal 50.

During an unloading operation, conveyor 32 can be swung from the field position extending rearwardly to the unloading position extending to the side of combine 10 (see FIG. 1). When in the field position, spout 40 can be positioned in the upward position (FIG. 6) covering or partially covering the end of conveyor 32. Seal 50 then acts as a sump to hold any grain falling out of conveyor 32 in the spout 40 without the grain dribbling through the interspatial gap 42. After or while the conveyor 32 is moved to the unloading position, spout 40 can be pivotally rotated downward to the unloading position. The extent to which the spout 40 is rotated downward can vary, depending on the desired degree of discharge of the grain from conveyor 32. As spout 40 is rotated downward, the grain that was lying on top of seal 50 then falls along bottom wall 46 into the receiving container, such as gravity wagon 31. This unloading process can occur with a stationary receiving container, or on-the-fly while combine 10 is still harvesting grain, or with an autonomous harvesting and unloading operation. After the unloading operation is completed, spout 40 can be folded to the upward position and conveyor 32 can be folded rearwardly to the field position.

In the embodiment illustrated above, the agricultural machine is in the form of a combine harvester. It is to be appreciated that the agricultural machine could be any type of self-propelled or towed agricultural vehicle or implement, such as a grain cart with an unloading conveyor, a gravity box with an unloading conveyor, etc, depending on the need or application. When configured as a combine harvester, the material to be unloaded using the unloading conveyor arrangement 30 is grain. When configured as a different type of agricultural machine, the material to be unloaded can be a different material such as granular fertilizer or herbicide, etc.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An unloading conveyor arrangement for an agricultural machine, comprising:
    a conveyor having a discharge end; and
    a spout arrangement at said discharge end of said conveyor, said spout and said discharge end have having an interspatial gap therebetween, said spout arrangement including:
        a spout which is movably connected to said discharge end, said spout including a bottom wall; and
    a seal which extends across said interspatial gap, said seal having a first end that is attached to one of said conveyor and said spout and a second free end which lies against the inside of said bottom wall.

2. The unloading conveyor arrangement of claim 1, wherein said seal includes a flexible bib.

3. The unloading conveyor arrangement of claim 2, wherein said flexible bib has one end which is attached to said discharge end and an opposite free end which lies against said bottom wall of said spout.

4. The unloading conveyor arrangement of claim 1, wherein said seal includes a non-linear hinge attachment with said discharge end of said conveyor.

5. The unloading conveyor arrangement of claim 4, wherein said non-linear hinge includes one of a curved strip, a piano hinge and a plastic hinge.

6. The unloading conveyor arrangement of claim 4, wherein said conveyor includes an auger tube, and wherein said seal includes a flexible bib which is connected to a bottom of said auger tube at said discharge end using a curved strip.

7. The unloading conveyor arrangement of claim 6, wherein said flexible bib is a rubber bib.

8. The unloading conveyor arrangement of claim 6, wherein said spout is pivotally connected to said discharge end of said conveyor, and further including a ball arrangement coupled to a bottom of said auger tube at said discharge end, said flexible bib being attached to said ball arrangement using said curved strip.

9. The unloading conveyor arrangement of claim 1, wherein said agricultural machine is a combine.

10. An agricultural combine harvester, comprising:
    a chassis;
    a clean grain tank carried by said chassis; and
    an unloading conveyor arrangement in communication with said clean grain tank, said unloading conveyor arrangement including:
        a conveyor having a discharge end; and
        a spout arrangement at said discharge end of said conveyor, said spout and said discharge end have having an interspatial gap therebetween, said spout arrangement including:
            a spout which is movably connected to said discharge end, said spout including a bottom wall; and
            a seal which extends across said interspatial gap, said seal having a first end that is attached to one of said conveyor and said spout and a second free end which lies against the inside of said bottom wall.

11. The combine harvester of claim 10, wherein said seal includes a flexible bib.

12. The combine harvester of claim 11, wherein said flexible bib has one end which is attached to said discharge end and an opposite free end which lies against said bottom wall of said spout.

13. The combine harvester of claim 10, wherein said seal includes a non-linear hinge attachment with said discharge end of said conveyor.

14. The combine harvester of claim 13, wherein said non-linear hinge includes one of a curved strip, a piano hinge and a plastic hinge.

15. The combine harvester of claim 13, wherein said conveyor includes an auger tube, and wherein said seal includes a flexible bib which is connected to a bottom of said auger tube at said discharge end using a curved strip.

16. The combine harvester of claim 15, wherein said flexible bib is a rubber bib.

17. The combine harvester of claim 15, wherein said spout is pivotally connected to said discharge end of said conveyor, and further including a ball arrangement coupled to a bottom of said auger tube at said discharge end, said flexible bib being attached to said ball arrangement using said curved strip.

18. A seal arrangement for an unloading conveyor used with an agricultural machine, the unloading conveyor including a discharge end and a spout arrangement defining an interspatial gap therebetween, the discharge end having an exterior surface with a contour, the spout arrangement having a spout with a bottom wall, said seal arrangement comprising:
   a seal having a first end configured to be attached to one of said unloading conveyor and said spout arrangement and a second free end which is configured to lie against the inside of said bottom wall, and a side surface with a contour which is configured for mating with the contour of the discharge end; and
   a connector component for attachment of said seal to said discharge end, such that said seal is configured to extend across the gap and on to the bottom wall when attached to the discharge end.

19. The seal arrangement of claim 18, wherein said seal includes a flexible bib and said side surface is an edge of said bib.

20. The seal arrangement of claim 19, wherein said side surface of said bib has a semi-circular contour.

21. The seal arrangement of claim 18, wherein said connector component includes a non-linear hinge.

22. The seal arrangement of claim 21, wherein said non-linear hinge includes one of a curved strip, a piano hinge and a plastic hinge.

* * * * *